United States Patent Office 3,327,981
Patented June 27, 1967

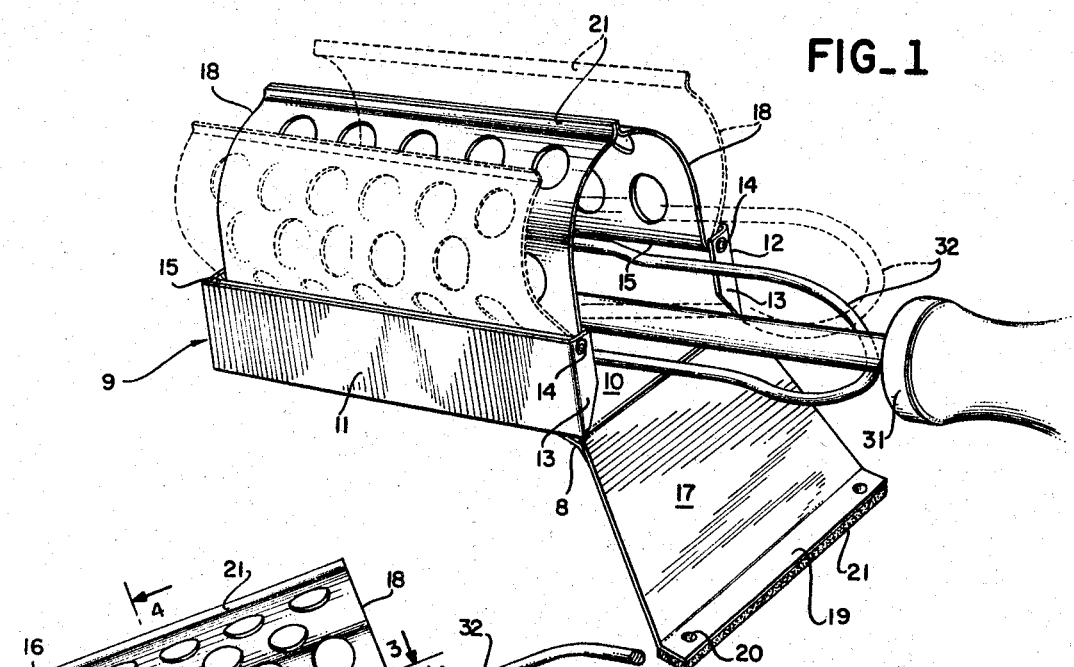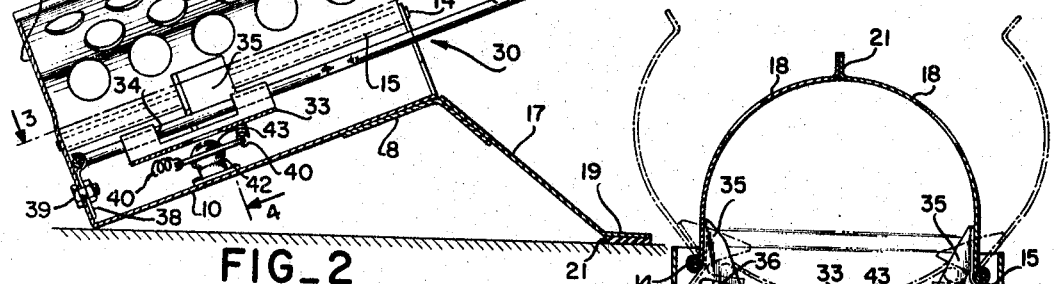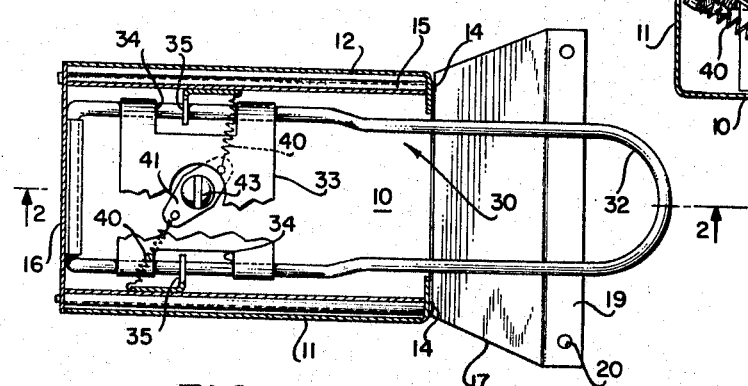

3,327,981
SOLDERING IRON HOLDER
Robert L. Yates, Santa Clara, Calif., assignor to
Lockheed Aircraft Corporation, Burbank, Calif.
Filed May 17, 1965, Ser. No. 456,071
5 Claims. (Cl. 248—176)

ABSTRACT OF THE DISCLOSURE

A desk top holder for soldering irons including automatically openable arcuate cover portions which are automatically closed by the weight of the soldering iron placed upon a "cradle" member.

The invention relates generally to the field of electronics manufacturing and is particularly directed to a novel holder for soldering irons which is especially adapted to be utilized in connection with modern high reliability electronics assembly methods.

Over the past few years the electronics industry has experienced an interesting and decided reduction in the size of the electronic component parts which are assembled together to produce electronic circuitry. This has primarily come about as the result of aerospace research where the need for lightweight and small sized electronics for inclusion in missile hardware and the like has been important.

As the size of electronic components has decreased, the size of electric soldering irons which have become almost universally utilized have also necessarily decreased in size and have become more delicate.

In the same period, production efficiencies and costs have become of crucial importance in an industry which is increasingly competitive so that time saved is in effect money earned.

The present invention has for its primary object the provision of a stand for soldering irons of the type which are utilized in electronics manufacture and assembly which is itself very low in cost compared to other commercially available stands and which in operation is considerably more efficient from a time saving standpoint than other commercially available soldering iron holders.

Prior art stands, and stands which are commercially available generally, are tubular in nature, constituting coils or cylinders into which a soldering iron is adapted to be inserted when it is not in use. Manifestly, soldering irons cannot be merely laid aside since they are particularly prone to being pulled off work benches and the like, and because of the weight of the cord connecting the stand to an electrical source, oftentimes of their own characteristics tend to slip off the bench. Additionally, benches may be marred and burned by irons laid upon them, and, especially with metal benches, the "heat sink" effect will oftentimes operate to require a greater amount of electric current in an iron to maintain a selected heat, thus resulting in a burning out of the iron.

In view of the foregoing it is an object of the present invention to provide a soldering iron holder or stand which is low in cost, easily installable on any working bench surface, and which is sturdy in operation.

Another object of the invention is to provide a soldering iron stand which materially lowers production costs and which at the same time contributes to the reliability of electronic systems being assembled, a factor which is increasingly important as the complexity of electronics systems increases.

A further object of the invention is the provision of a soldering iron stand which is automatically open and closed, and which at the same time is adjustable, and from which soldering irons can be removed and replaced either vertically or horizontally without the necessity of the assembler removing his eyes from the delicate electronic assembly upon which he is working. These and other objects and advantages of the invention will become apparent from a consideration of a detailed description of the device as set forth in the attached drawings including FIGURES 1 through 4 in which:

FIGURE 1 is an isometric view of the soldering iron holder of the present invention,
FIGURE 2 is an elevational side view of the stand,
FIGURE 3 is a plan view of the invention, and
FIGURE 4 is an elevational end view of the holder portion (with the angled skirt section not shown).

Turning to the drawing, a detailed description of the invention follows with first reference being taken to FIGURE 1 wherein a base or cradle member 9 is seen to consist of a bottom 10 preferably formed with bent upstanding side walls 11, each of which has an inwardly directed flange 13 at the open end, and an upstanding end member 16 formed at substantially right angles with the bottom 10.

Base or cradle member 9 is generally supported in an inclined manner to the horizontal bench surface by means of a flared skirt section 17 adapted to be attached to bottom 10 by means of an angled channel member 8, one channel of which is attached to bottom 10 and the other to flared skirt section 17. Manifestly, if necessary to reduce production costs, flared skirt section 17 may be attached to bottom 10 through means of a downwardly directed flange extending from bottom 10 constituting the portion of the end of cradle member 9 resulting from the cuts necessary to produce the flanges 13. Desirably, flared skirt section 17 is provided with an angled flange 19 adapted to be in horizontal alignment with a supporting bench surface, and which may be provided with holes such as shown at 20 for permanent attachment to a work bench or the like, or which angled flange 19 may alternatively be provided with a friction pad 21. Manifestly, both friction pad 21 and holes 20 may advantageously be provided in the angled flange 19 to allow for diversity of installation.

A pair of curved cover members 18 are provided which are hingedly and rotatably attached to cradle 9 through the use of hinge pins 14 which are inserted into substantially cylindrical channels 15 formed in the edge portion of curved cover members 18. Hinge pins 14 are journaled in flanges 13 at one end and end 16 in any manner known in the art such as by providing the hinge pins 14 with a smaller diameter end section adapted to be inserted into holes in flanges 13 and end 16. Desirably, in order to effectuate a neater appearance and a more effective closure, curved cover members 18 are provided along their upper edges with a pair of facing flanges 21. Curved cover members 18 are also perforated with a plurality of apertures which are designed to prevent undue concentration of heat through reflection from the inner surfaces of the curved cover members as an aid in maintaining the proper constancy of temperature of the soldering iron. Such apertures also assure that the curved cover members 18 will not assume a temperature high enough to burn the skin of a person which might come in contact with the stand.

A platform assembly 30 is provided to hold a soldering iron shown generally at 31, which platform assembly 30 consists of a generally U-shaped pivotal member 32 which is closed at one end and which is adapted at the other end to be pivotally connected to end 16. This pivotal journaling may be effected by means of a plate 38 attached to end 16 by means of a bolt or soldering shown as at 39. At the end of U-shaped pivotal member 32 nearest end 16, and extending across the transverse portion of pivotal member 32 is a platform base 33 which is, as shown more particularly in FIGURE 4, slightly curved in transverse cross-section so as to be adaptive to the support of a soldering iron such as shown at 31 in FIGURE 1. This platform base 33 may be attached to the wire or rod constituting the sides of pivotal member 32 in any acceptable manner as by soldering, or by having substantially circular end channels formed on either side of the platform base adapted to receive the ends of pivotal member 32. As noted best in FIGURE 2 and in FIGURE 3 platform base 33 is provided with a cut-out portion along either side thereof intermediate the end portions. This cut-out portion generally designated 34 is provided in order that the curved cover members may be operably connected to and associated with the pivotal member 32.

This association is accomplished through a pair of notched detents 35 which are appropriately attached to the upstanding, substantially vertical portion of cover members 18. As best observed from a consideration of FIGURE 4, notched detents 35 are each provided with an inwardly opening slot 36 which is situated so as to receive pivotal member 32 therein. Notched detents 35 are so attached to hinged cover members 18 so that when these cover members are closed and the facing flanges 21 in contact, the pivotal member will be at the lower portion of its excursion.

It is desirable to maintain curved cover members 18 in a substantially opened position as shown in dotted line relationship in FIGURE 1 and in FIGURE 4 so as to be ready to receive a soldering iron which may be more or less vertically deposited onto the base provided by the end of U-shaped pivotal member 32 and the platform base 33. The weight of a soldering iron is intended to maintain the curved cover members 18 in a substantially closed position while the iron is resting in the stand.

One of the features of the soldering iron stand according to the present invention resides in the fact that the soldering iron may be removed vertically therefrom without having to carefully insert and withdraw it from a cylindrical receptacle which is the design most currently in use. This substantially vertical withdrawal requires an opening of the cover members 18, which opening is desirably automatically effected in accordance with one feature of the invention in the following manner, namely, a bias is applied so as to maintain cover members 18 in an open position when an iron is not resting upon the pivotal member and platform base. This bias is applied through a pair of springs 40, one end of which is attached to the lower portion of notched detents 35, which lower portion extends beneath or lower than the hinge formed by hinge pins 14 between the curved cover members 18 and the sides 11 of cradle or base member 9. It is noted that the notched detents 35 are desirably outwardly extended at the bottom portion in such manner that as the cover members are opened the lower portion of notched detents 35 are substantially vertically disposed.

The other end of springs 40 are adapted to be received within a rotatable adjustment plate 41 which, as seen in the plan view of FIGURE 3, is composed of a substantially oblong member having a pair of holes in either end of attachment of the springs. This adjustment plate 41 is attached to bottom 10 of cradle member 9 through a vertically extending stand 42. Stand 42 is desirably internally threaded so as to receive adjustment screw 43, it being noted that stand 42 may be attached to bottom 10 by soldering, or by means of a riveted plate such as is best shown in FIGURE 4.

OPERATION

The device is desirably adjusted by loosening the adjustment screw 43 and turning adjustment plate 41 in such a way that a bias tension is applied to springs 40. The screw is tightened to maintain adjustment plate 41 in permanent position, and it will be seen that when no soldering iron is placed in the stand, springs 40, acting through hinge pins 14, operate to maintain the curved cover members 18 in open position adapted to receive a soldering iron.

As a soldering iron is placed upon platform assembly 30, the weight of the soldering iron will cause the U-shaped pivotal member 32 to rotate downwardly. This downward movement, acting through the slots 36, causes the hinged cover members 18 to close, furnishing the advantageous effects noted hereinabove. In this postition the soldering iron is safely maintained in an easily accessible manner upon an electronics assembly bench ready for immediate use. As it is withdrawn, and the weight of the iron released from the platform assembly 30, it will be seen that the springs immediately cause curved cover members 18 to open, so that the iron may be removed in such a way that there is little if any danger that the soldering iron tip will come into contact with the stand.

In operation the device operates and responds to pressures applied by the soldering iron almost instantaneously so as to afford a very efficient soldering iron holder.

It is also contemplated that the invention may be suitably modified so as to provide attenuated switching to control the temperatures of a soldering iron. A microswitch may be suitably positioned by securement to base member 9 in such a way that the switch will be operated by the raising and lowering of the platform assembly 30 so that when the assembly is "down" as when a soldering iron is resting thereon, the current will be lowered and the iron cooled somewhat. When the platform is raised the current is routed through a second path with lesser resistance and more heat is applied to the iron as needed in a soldering operation.

While a preferred embodiment of the invention has been herein shown and described, it is to be understood that other embodiments of the invention are considered to fall within the scope of protection and definition set forth in the following claims wherein I claim as my invention.

1. A soldering iron stand comprising a base member constituting the bottom portion of an enclosure adapted to receive a soldering iron, and a pair of cover members hingedly mounted to said base member, biasing means associated with said cover members and said base adapted to maintain said cover members in an open position in the absence of a soldering iron and which automatically close said cover members to form a longitudinal enclosure when an iron is placed on said stand, said biasing means including a substantially U-shaped pivotal member pivotally mounted to said base at one end thereof, said U-shaped member having a soldering iron receiving platform secured thereto, said U-shaped member being flexibly journaled to said U-shaped cover members, and spring biasing means attached to said base and said cover members for holding said cover members normally open in the absence of the weight of a soldering iron placed upon said platform base.

2. A soldering iron holder comprising a base member having a bottom portion, a pair of upstanding sides, and an upstanding end portion, a pair of curved cover members longitudinally, pivotally connected to the upper portion of said upstanding sides, a U-shaped member pivotally journaled at one end to said upstanding end, a platform base member extending across and attached to said U-shaped member near the point at which said U-shaped member is journaled to said end member, springs attached at one end to said curved cover members, and at the other end to said bottom position for urging and biasing said curved cover members into a normally open position, detent means connected to said curved members and associated with said U-shaped member for causing said cover members to close when a weight is placed upon said U-shaped member, and adjustment means whereby the tension of said springs may be adjusted.

3. A soldering iron stand as claimed in claim 2 wherein said adjustment means for attaching said springs to said bottom comprises a vertically extending stand provided with a threaded opening in substantially vertical alignment therein, and adapted to receive an adjustment screw, an adjustment plate positioned between the head of said adjustment screw and the top of said vertically extending stand whereby said adjustment plate may be rotated and selectably secured in any desired position, apertures in the end portions of said adjustment plate into which the ends of said springs are inserted.

4. A soldering iron stand as claimed in claim 2, wherein said detent means comprises a notched detent comprising a flange inwardly extending into the area formed by said curved cover members, said notched detents having an inwardly opening slot provided therein through which the legs of said U-shaped pivotal member transversely extend, said notched detents being provided with an integral downwardly extending flange, the lower end portions of each of said flanges having an aperture therein through which one end of said spring is adapted to be inserted.

5. A soldering iron stand comprising a cradle member having a bottom, and side walls upstanding therefrom at substantially right angles to said bottom, an end wall upstanding from said bottom member at substantially a right angle thereto, a pair of inwardly directed flanges extending only partially into the open end of said cradle member at the end opposite said end wall, a flared skirt section attached to said bottom and extending generally downwardly so as to provide a leg supporting said cradle member in an angled position to the horizontal, said skirt member having a flange at the bottom portion thereof in substantially horizontal alignment with the base upon which said stand is adapted to rest, an aperture in the upper portion of each of said inwardly extending flanges adapted to receive the end of a hinge pin, said hinge pin extending to and journaled into said upstanding end at the opposite end thereof and providing a hinged, pivotal mount attaching a curved cover member to and in substantially longitudinal alignment with each of said upstanding sides, said curved cover members being provided with a series of apertures, each of said curved cover members terminating at the longitudinal edge opposite said hinged attachment in a pair of mating longitudinally-aligned faces, a notched detent attached on the inside surface of each of said curved cover members and extending transversely inwardly towards the opposite cover member, each of said detents being provided with a transverse inwardly extending open slot and receiving the leg portions of said pivotal U-shaped member, said inwardly extending detent members being provided with a downwardly extending flange having an aperture at the lower end portion thereof, a spring having one of its ends attached through the aperture of said flange, and the other attached to an adjustment plate, said adjustment plate being adjustably secured to said bottom through a substantially vertically extending stand, said adjustment plate being adapted to be semi-permanently set in any given position of rotation whereby the tension on said springs may be varied, said curved cover members pivotally rotating into substantial alignment as said U-shaped pivotal member is rotated about its pivoted attachment to said upstanding end.

References Cited

UNITED STATES PATENTS

| | | | |
|---|---|---|---|
| 1,616,721 | 2/1927 | Vallin | 248—44 |
| 2,172,682 | 9/1939 | Rauba | 248—44 |
| 2,174,230 | 9/1939 | Shangle | 248—176 |
| 2,516,245 | 7/1950 | Nickerson | 248—42 |
| 2,682,127 | 6/1954 | Binder | 248—42 X |
| 3,215,815 | 11/1965 | Lerner | 248—176 X |

ROY D. FRAZIER, *Primary Examiner.*

CLAUDE A. LE ROY, *Examiner.*

K. J. WINGERT, *Assistant Examiner.*